July 27, 1965 HANNS-DIETER PASCHKE 3,196,849
APEX SEAL CONSTRUCTION FOR ROTARY COMBUSTION ENGINE
Filed March 1, 1962 2 Sheets-Sheet 1
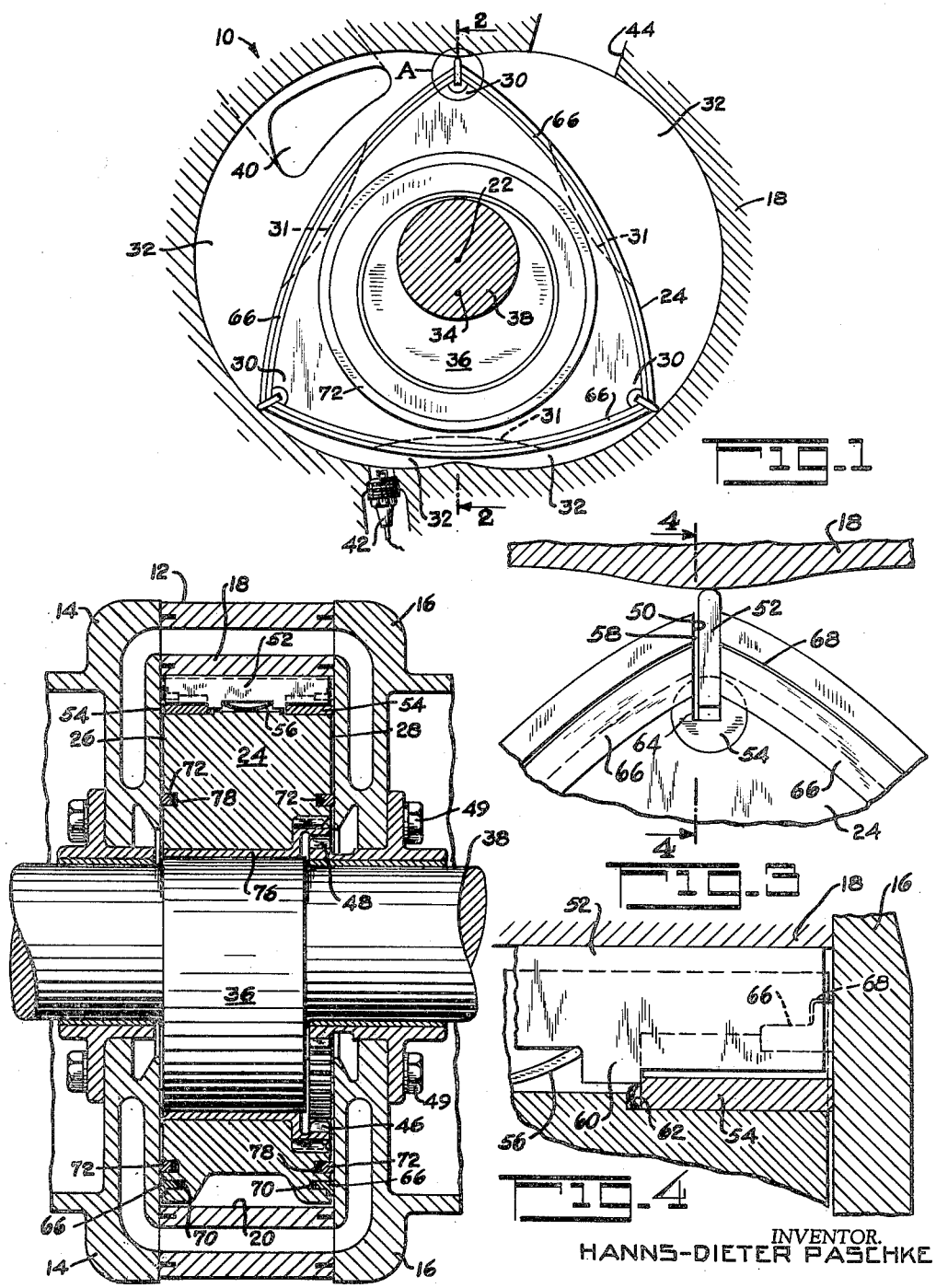
INVENTOR.
HANNS-DIETER PASCHKE
BY
William V. Ebs
ATTORNEY

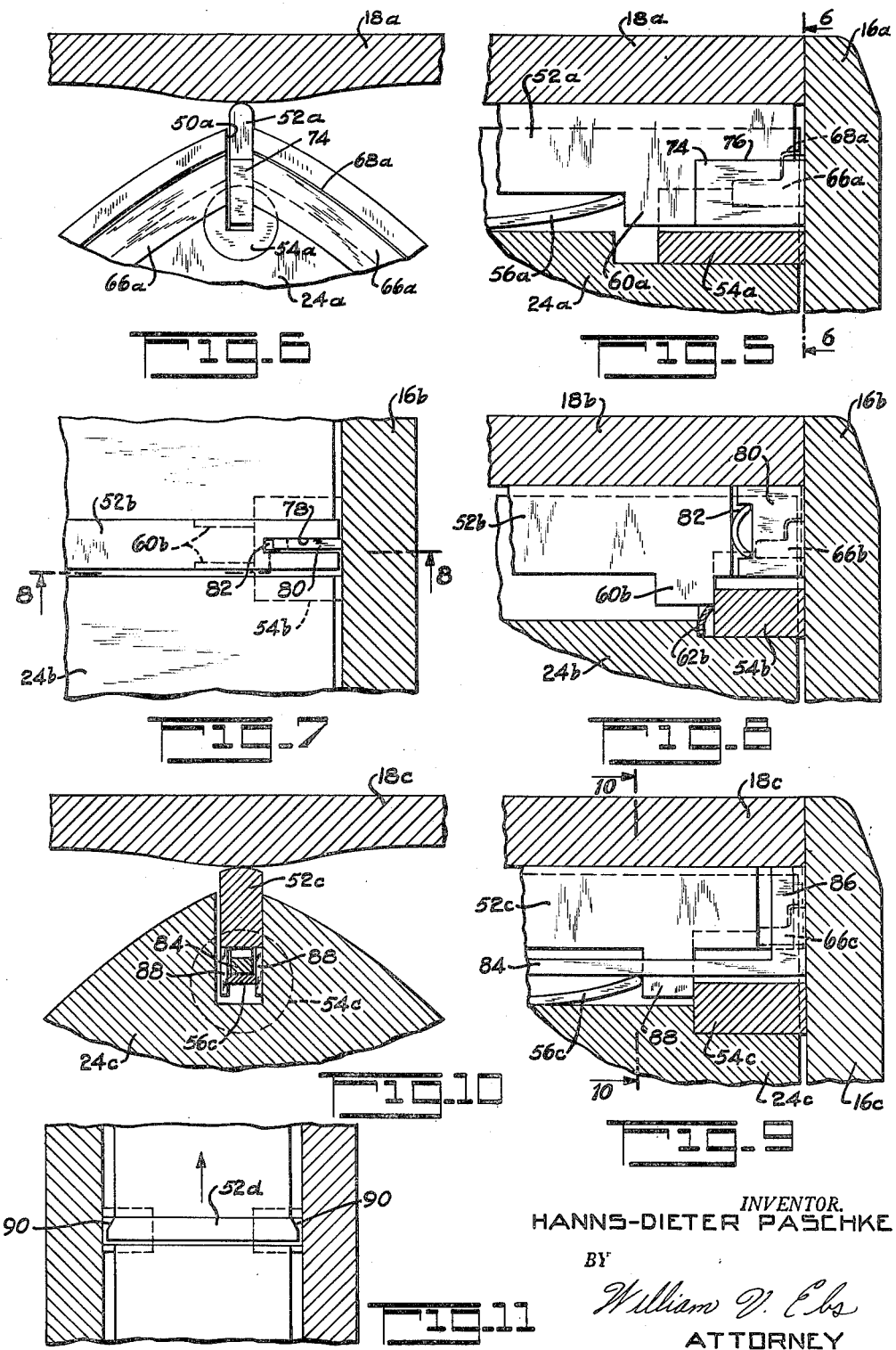

United States Patent Office 3,196,849
Patented July 27, 1965

3,196,849
APEX SEAL CONSTRUCTION FOR ROTARY COMBUSTION ENGINE
Hanns-Dieter Paschke, Neckarsulm, Germany, assignor to NSU Motorenwerke Aktiengesellschaft, Neckarsulm, Germany, and Wankel G.m.b.H., Lindau (Bodensee), Germany, both corporations of Germany
Filed Mar. 1, 1962, Ser. No. 176,590
Claims priority, application Germany, Mar. 25, 1961, N 19,790
2 Claims. (Cl. 123—8)

The invention relates to rotary combustion engines such as shown, for example, in Patent No. 2,988,065 of Felix Wankel and Ernst Hoeppner issued June 13, 1961, and is particularly directed to a seal construction for such engines.

Such combustion engines comprise an outer body having axially-spaced end walls interconnected by a peripheral wall to form a cavity therebetween and an inner body or rotor received within said cavity between the cavity end walls. The inner surface of said peripheral wall preferably is parallel to the axis of said cavity and, as viewed in a plane transverse to said axis, said inner surface has a multi-lobed profile which preferably is an epitrochoid. The axis of said rotor is parallel to but spaced from the axis of the outer body cavity and said rotor has axially-spaced end faces disposed adjacent to said outer body end walls and also has a plurality of circumferentially-spaced apex portions. The rotor is rotatable relative to the outer body such that said apex portions continuously engage the inner surface of said peripheral wall to form a plurality of working chambers between said rotor peripheral wall which vary in volume, during engine operation, as a result of relative rotation of said rotor and outer body. Such engines also include an intake port for admitting a fuel-air mixture to said chambers, an exhaust port for said chambers and suitable ignition means such that during engine operation the working chambers of the engine have a cycle of operation which includes the four phases of intake, compression, expansion and exhaust. As described in said Patent No. 2,988,065 this cycle of operation is achieved as a result of the relative rotation of said inner rotor and outer body and for this purpose both said inner rotor and outer body may rotate or one, preferably the inner rotor, may rotate while the outer body is stationary.

For efficient operation of the engine, its working chambers should be be sealed and, therefore, an effective seal should be provided between each rotor apex portion and the inner surface of the peripheral wall of the outer body as well as between the end faces of the inner rotor and the end walls of the outer body.

It is common practice to provide a one-piece seal strip at each apex portion of the rotor for the purpose of forming a seal with the peripheral wall of the outer body. Each such seal strip is generally carried in a radial groove extending across the breadth of the rotor. The seal strips having sliding fits in the grooves and each is urged radially outward as by a spring into sealing engagement with the peripheral wall of the outer body. As the rotor turns, the seal strips, if functioning properly, move radially as necessary to maintain sealing contact with the peripheral wall. Friction, however, sometimes interferes with proper functioning of the seal strip, that is, friction between ends of the seal strips and the end walls of the outer body, the frictional forces generated by the rubbing action of the strips against an end wall due to rotation of the rotor being effective at times to prevent the seal strips from moving freely as required for maintaining a good seal with the peripheral wall.

A prime object of the invention is to provide an improved rotor apex seal construction for a rotary combustion engine, such seal construction being so arranged as to assure free radial motion of a peripheral wall sealing strip and the maintenance of a good seal between such strip and the peripheral wall defining the cavity within such rotor rotates.

Other objects and advantages of the invention will become apparent during a reading of the specification taken in connection with the accompanying drawings in which:

FIG. 1 is a diagrammatic transverse view of a rotary engine embodying a rotor apex seal construction according to the invention;

FIG. 2 is a sectional view taken along the line 2—2 of FIG. 1;

FIG. 3 is an enlarged view of a portion A of FIG. 1;

FIG. 4 is a sectional view taken along the line 4—4 of FIG. 3;

FIG. 5 is a view similar to FIG. 4 showing a modified seal construction;

FIG. 6 is a view taken on the plane of the line 6—6 of FIG. 5;

FIG. 7 is a top plan view showing another modified apex seal construction;

FIG. 8 is a view taken along the line 8—8 of FIG. 7;

FIG. 9 is a view similar to FIG. 8 showing still another modified apex seal construction;

FIG. 10 is a view taken along the line 10—10 of FIG. 9;

FIG. 11 is a top plan view showing yet another modified apex seal construction.

Referring to FIGS. 1 and 2, reference character 10 designates a rotary internal combustion engine. Said engine 10 comprises an outer body 12 having axially-spaced end walls 14 and 16 with a peripheral wall 18 connected therebetween to form a cavity 20 which, as viewed in a plane (FIG. 1) transverse to the axis 22 of the cavity 20, has a multi-lobed profile. In the specific embodiment illustrated, said cavity profile has two lobes although the engine is not limited to this specific number of lobes.

An inner rotor 24 is disposed within the cavity 20 of the outer body 12. The inner rotor has axially-spaced end faces 26 and 28 disposed adjacent to the outer body end walls 14 and 16. In addition, the inner rotor has a plurality of circumferentially-spaced apex portions 30 which, as explained in said aforementioned application, preferably are one more in number than the number of lobes of the cavity 20. As illustrated, the rotor 24 has three apex portions 30 and the periphery of the rotor has a generally triangular profile. As hereinafter more fully explained, said apex portions 30 are in sealing engagement with the inner surface of the peripheral wall 18 to form a plurality (three as illustrated) of working chambers 32 between the inner rotor 24 and outer body 12. Each working chamber 32 includes a trough 31 formed in the adjacent peripheral face of the rotor 24, each said trough forming a substantial part of the combustion space during combustion in said chamber. The geometrical axis 34 of the rotor 24 is offset from and is disposed parallel to the axis 22 of the outer body.

In the engine 10 illustrated, the outer body 12 is stationary while the inner rotor 24 is journaled on an eccentric portion 36 of a shaft 38, the axis of said shaft being co-axial with that of the cavity 20 of said outer body. Upon rotation of the inner rotor 24 relative to the outer body 12 the working chambers 32 vary in volume. An intake port 40 is provided in one or both end walls 14 and 16 for admitting air and fuel into the working chambers, a spark plug 42 is provided for igniting the combustion mixture and an exhaust port 44 is provided in the peripheral wall for discharge of the exhaust gases from the working chambers 32. As more fully explained in the aforementioned patent, during engine operation the working chambers 32 have a cycle of operation including the four phases of intake, compression, expansion and exhaust, said phases being similar to the strokes in a reciprocating-type internal combustion engine having a four-stroke cycle. In order to maintain the relative motion of the inner rotor 24 relative to the stationary outer body an internal gear 46 is, as illustrated, co-axially secured to the inner rotor and is disposed in mesh with a fixed gear 48 secured to the outer body by bolts 49, said fixed gear being co-axial with the shaft 38. As also explained in said patent, the outer body 12, as well as the inner body 24, may rotate instead of, as in the embodiment illustrated, only one of said bodies rotating.

For efficient operation, the working chambers 32 should be sealed. FIGS. 1–4 show one form of seal according to the invention, for accomplishing this purpose. Referring to these views it will be seen that each rotor apex portion 30 has a groove 50 extending inwardly, preferably radially, from the apex and running from one end face 26 to the other end face 28 in a direction parallel to the rotor axis. Each of these rotor grooves carries identical structure for forming a seal with the inner surface of the peripheral wall 18 of the outer body 12 and with the inside surface of the end walls 14 and 16 of the outer body. Such structure includes a seal strip 52 and intermediate seal members 54 located at opposite ends of the groove.

Seal strip 52 is urged by a spring 56 into sealing engagement with the inner surface of peripheral wall 18 of the outer body 12. As shown, spring 56 is located under the seal strip 52 and bears against both the seal strip and the bottom of the groove. The seal strip has a sliding fit in the groove and during operation of the engine is urged laterally into sealing engagement with one side or the other of groove 50, a slight clearance 58 being left at the other side face of the groove. Gas pressure is transmitted from the adjacent working chamber through gap 58 to the bottom of the groove where it adds to the force of spring 56, urging sealing strip 52 radially outwardly. Seal strip 52 is made shorter in length than the distance between the end walls 14 and 16 of the outer body adjacent to the rotor 24 and is prevented from contacting the end walls 14 and 16 by the intermediate sealing members 54.

As shown, the intermediate seal members 54 each abut a projecting portion 60 on seal strip 52 to thereby maintain end surfaces of the seal strip out of contact with end walls 14 and 16. The intermediate seal members 54 are of the type shown, for example, in Patent 3,003,180 of Max Bentele for Rotating Combustion Engine Seal Construction, issued May 8, 1962, such intermediate seal members 54 being each slidably received in a cylindrically enlarged portion at each end of groove 50. The seal members 54 are urged by springs 62 into sealing engagement with adjacent end walls of the outer body 12, and each member 54 has a slot 64 for receiving the seal strip 52 for sealing co-operation therewith. Gas pressure, which is transmitted through clearance 50 into the bottom of the groove adds to the force of springs 62 which urge the seal members 54 into contact with the end walls of the outer body.

The intermediate seal members 54 co-operate at each end thereof with seal strips 66 to provide a continuous contact area in sealing engagement with the adjacent end wall 14 or 16 of the outer body 12, said seal contact area encircling the rotor axis and being disposed adjacent to the rotor periphery, whereby a seal is provided adjacent to the rotor periphery against inward flow of combustion gases between the rotor end faces 26 and 28 and the end walls 14 and 16. As shown, the seal strips 66 are received in grooves 68 which are located in each end face of the rotor and run between the grooves 50. The end face seal strips 66 extend to each of grooves 50 for sealing engagement with one side face or the other of seal strip 52. A spring 70 behind each end face seal strip 66 urges it axially outwardly so that said strip projects axially beyond the adjacent rotor end face into sealing engagement with the adjacent housing end wall.

In addition a seal ring 72 is disposed in a circular groove in each end face of the rotor radially outwardly of the journal bearing 76 for said rotor on the shaft eccentric 36 and radially inwardly of the end face seal strips 66. The seal rings 72 function as oil seals to prevent leakage of lubricating oil radially outwardly beyond said seal rings 72 between their associated rotor end faces and outer body end walls. Suitable spring means 78 may be provided behind each oil seal 72.

FIGS. 5 and 6 illustrate a modification of the apex sealing structure shown in FIGS. 1–4. Parts in FIGS. 5 and 6 corresponding to parts shown in FIGS. 1–4 are designated by the same reference characters but with a subscript added thereto. The sealing construction of FIG. 5 is generally similar to that of FIGS. 1–4, however, in the modified construction, axial movement of peripheral wall sealing strips $52_a$, which as in the construction of FIGS. 1–4, are shorter in length than the distance between the end walls of the outer body adjacent thereto, is limited by elements 74 rather than by the intermediate seal members. An element 74 is located at each end of the groove $50_a$ in contact with a projected portion $60_a$ of sealing strip $52_a$. The distance between the end faces of elements 74 adjacent the end walls is such that a good seal exists between the end walls and the adjacent surfaces of said elements 74 when the engine is at normal operating temperatures. By means of the elements 74 leakage of gas between adjacent working chambers is reduced, since the elements 74 partially close the gap between adjacent working chambers at the ends of the rotor. In the construction shown, gas pressure at the bottom of the groove maintains the intermediate seal members $54_a$ in contact with adjacent end walls of the outer body. A spring such as shown in the construction of FIG. 4 may be provided to urge the intermediate seal members against the end walls if desired. During normal operation of the engine the elements 74 are caused, by gas pressure at the bottom of the groove, to assume radially outward positions as shown where they contact seal strip $52_a$ along surface 76.

Another modification of the apex seal structure of the invention is shown in FIGS. 7 and 8 wherein parts corresponding to the parts shown in FIGS. 1–4 are designated by the same reference characters, but with a subscript $b$ added thereto. In the apex seal construction of FIGS. 7 and 8 the peripheral sealing strip designated by reference character $52_b$ includes a groove 78 at each end. Slidably fitted within each groove 78 is an element 80 which is urged by a spring 82 into sealing engagement with the adjacent end wall of the outer body. Seal strip $52_b$, which is shorter in length than the distance between end walls of the outer body, is maintained out of contact with the end walls as in the form of the invention shown in FIGS. 1–4, that is, by intermediate seal members $54_b$, the seal strip $52_b$ having projections $60_b$ near each end that contact the seal members. The elements 80 substantially prevent the leakage of gas between adjacent combustion chambers around the ends of the sealing strip $52_b$. The elements 80 are urged radially outward by gas pressure during the operation of the engine into contact with the peripheral wall $18_b$ as shown.

Reference is now made to FIGS. 9 and 10 showing still another modification of the invention and wherein parts corresponding to parts in FIGS. 1–4 are designated by the same reference characters, but with a subscript $c$ added thereto. The apex seal construction of FIGS. 9 and 10 is similar to the seal construction of FIGS. 7 and 8 in that the peripheral wall sealing member which is here denoted by reference character $52_c$ is grooved as shown in FIG. 7. In place of the separate sealing elements described in connection with FIGS. 7 and 8, however, a U-shaped member 84 is provided, having end portions 86 which are received in the grooves of the peripheral seal strip. The overall length of the U-shaped member 84 is such that a good seal is maintained between the radially extending ends of member 84 and the adjacent end walls when normal operating temperatures prevail in the engine. Seal strip $52_c$ which is shorter in length than the distance between the end walls of the outer body, is held out of contact with such end walls by means of projections 88 that extend from member $52_c$ on both sides of member 84 and contact intermediate seal members $54_c$.

FIG. 11 shows yet another form of the invention in which parts corresponding to parts in FIGS. 1–4 are designated by the same reference characters, but with a subscript $d$ added thereto. In this form of the invention the peripheral wall sealing strip $52_d$, which is shorter in length than the distance between the walls of the outer body, as in all of the preceding forms of the invention, is maintained out of contact with the end walls by beveling the end surfaces 90 of the seal strip $52_d$ toward the leading edge of the strip, that is, the edge which leads, as the rotor turns within the cavity defined by the outer body of the engine. The bevel at each end of the seal strip channels lubricating oil between the end faces of the strip $52_d$ and adjacent end walls, and the oil maintains the seal strip floating in a mean position between the end walls so that contact with the end walls is avoided.

Although several modifications of the invention have been shown, it will nevertheless be apparent to those skilled in the art that still other forms might be devised incorporating the features of the invention and that various changes and modifications might be made in the constructions shown without departing from the spirit or scope of the invention.

What is claimed is:

1. A sealing arrangement for the working chambers of a rotary combustion engine comprising an outer body having axially-spaced end walls and a peripheral wall interconnecting said end walls to form a cavity therebetween; an inner rotor received within said cavity and having axially-spaced end faces adjacent to said end walls and also having a plurality of circumferentially-spaced apex portions each including a groove which extends axially across the entire breadth of the rotor; said sealing arrangement comprising a radially movable seal strip in each groove in sealing engagement with the peripheral wall, shorter in length than the axial distance between the end walls of the outer body and out of contact with each end wall; and a pair of spacer elements in each rotor groove with each spacer element underlying an end portion of the seal strip, each of said spacer elements having one end in contact with the adjacent end wall of the outer body and the opposite end in contact with the seal strip to thereby maintain the seal strips spaced from each of the outer body end walls.

2. A sealing arrangement for the working chambers of a rotary combustion engine comprising an outer body having axially-spaced end walls and a peripheral wall interconnecting said end walls to form a cavity therebetween; an inner rotor received within said cavity and having axially-spaced end faces adjacent to said end walls and also having a plurality of circumferentially-spaced apex portions each including a groove which extends axially across the entire breadth of the rotor; said sealing arrangement comprising a radially movable seal strip in each apex groove in sealing engagement with the peripheral wall, shorter in length than the axial distance between the end walls of the outer body and out of contact with each end wall; a pair of spacer elements in each apex groove with each element underlying an end portion of the seal strip, each of said spacer elements having one end in contact with the adjacent end wall of the outer body and the opposite end in contact with the seal strip to thereby maintain the seal strips spaced from each of he outer body end walls; a pair of members in each apex groove with each member underlying one of the said spacer elements in the apex groove, said member extending into sealing engagement with the adjacent end wall of the outer body; and a set of end face sealing strips equal in number to the number of apex portions for each of the end faces of the rotor, said strips extending adjacent the rotor periphery in grooves in the rotor end faces from one apex groove to the adjacent apex groove and being in sealing engagement with the said members and the adjacent outer body end wall to provide a substantially continuous seal encircling the rotor axis, and with the end face sealing strips terminating opposite side faces of the seal strips and underlying spacer elements located in the apex grooves whereby said side faces may seal against the end face sealing strips.

References Cited by the Examiner

UNITED STATES PATENTS

| | | | |
|---|---|---|---|
| 732,671 | 6/03 | Andrews | 103—136 |
| 1,280,306 | 10/19 | Rolaff | 230—152 |
| 1,350,231 | 8/20 | McFarland | 123—8 |
| 2,326,803 | 8/43 | Samiran | 103—136 |
| 2,521,595 | 9/50 | Miller | 103—136 |
| 2,722,201 | 11/55 | Muse | 230—145 |
| 2,880,045 | 3/59 | Wankel | 123—8 |
| 2,979,042 | 4/61 | Bentele | 123—8 |
| 3,000,324 | 9/61 | Rosean | 103—136 |
| 3,056,391 | 10/62 | Hoadley | 123—8 |
| 3,064,880 | 11/62 | Wankel | 103—136 |
| 3,081,745 | 3/63 | Hurley | 123—8 |
| 3,098,471 | 7/63 | Cassady | 123—8 |
| 3,102,518 | 9/63 | Anderson | 123—8 |

KARL J. ALBRECHT, *Primary Examiner.*

LAURENCE V. EFNER, WILBUR J. GOODLIN, JOSEPH H. BRANSON, JR., *Examiners.*